US009825316B2

(12) United States Patent
Hood et al.

(10) Patent No.: US 9,825,316 B2
(45) Date of Patent: Nov. 21, 2017

(54) HYDROGEN PRODUCING FUEL CARTRIDGE AND METHODS FOR PRODUCING HYDROGEN

(71) Applicant: Intelligent Energy Limited, Loughborough, Leicestershire (GB)

(72) Inventors: Peter David Hood, Loughborough (GB); Henri Winand, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 116 days.

(21) Appl. No.: 15/014,281

(22) Filed: Feb. 3, 2016

(65) Prior Publication Data

US 2016/0164123 A1 Jun. 9, 2016

Related U.S. Application Data

(60) Division of application No. 14/521,175, filed on Oct. 22, 2014, now Pat. No. 9,266,728, which is a (Continued)

(51) Int. Cl.
*H01H 61/02* (2006.01)
*B01J 7/00* (2006.01)
(Continued)

(52) U.S. Cl.
CPC .......... *H01M 8/04208* (2013.01); *B01J 7/00* (2013.01); *C01B 3/04* (2013.01); *C01B 3/065* (2013.01); *H01H 37/34* (2013.01); *H01H 37/761* (2013.01); *H01H 37/767* (2013.01); *H01H 61/02* (2013.01); *H01M 8/04216* (2013.01); *H01M 8/065* (2013.01); (Continued)

(58) Field of Classification Search
CPC . H01M 8/04208; H01M 8/04216; C01B 3/04; B01J 7/00
See application file for complete search history.

(56) References Cited

U.S. PATENT DOCUMENTS 2,934,628 A  4/1960 Massar et al.
3,638,083 A  1/1972 Dornfeld et al.
(Continued)

FOREIGN PATENT DOCUMENTS

CN  1518151 A  8/2004
CN  1745485 A  3/2006
(Continued)

OTHER PUBLICATIONS

European Patent Application No. 13764160.1; Extended Search Report; dated Mar. 7, 2016; 12 pages.
(Continued)

*Primary Examiner* — Matthew Merkling
(74) *Attorney, Agent, or Firm* — Baker & Hostetler LLP (57) ABSTRACT

In aspects of the disclosure, a fuel cartridge wherein the fuel is in a powdered form is admixed with inert materials such as alumina or other ceramics to improve thermal conductivity. Said cartridge having fuel zones, heating zones, and controllers to selectively heat fuel zones and thereby generate hydrogen via decomposition of fuel is disclosed.

15 Claims, 11 Drawing Sheets

Related U.S. Application Data continuation of application No. PCT/US2013/030148, filed on Mar. 11, 2013.

(60) Provisional application No. 61/614,868, filed on Mar. 23, 2012.

(51) Int. Cl.

| | | |
|---|---|---|
| *C01B 3/04* | (2006.01) | |
| *H01H 37/34* | (2006.01) | |
| *H01H 61/04* | (2006.01) | |
| *H01M 8/04082* | (2016.01) | |
| *H01H 37/76* | (2006.01) | |
| *H01M 8/065* | (2016.01) | |
| *C01B 3/06* | (2006.01) | |
| *H05B 1/02* | (2006.01) | |

(52) U.S. Cl.
CPC .................... *C01B 2203/0272* (2013.01); *C01B 2203/066* (2013.01); *C01B 2203/085* (2013.01); *C01B 2203/1205* (2013.01); *H01H 61/04* (2013.01); *H05B 1/0205* (2013.01); *Y02E 60/362* (2013.01); *Y02E 60/364* (2013.01); *Y02E 60/50* (2013.01)

(56) References Cited

U.S. PATENT DOCUMENTS

| | | | |
|---|---|---|---|
| 3,763,454 A | 10/1973 | Zandonatti | |
| 4,047,143 A | 9/1977 | Burden et al. | |
| 4,107,759 A | 8/1978 | Shirn et al. | |
| 4,275,432 A | 6/1981 | Napiorkowski | |
| 4,351,806 A | 9/1982 | Galloway | |
| 4,419,564 A | 12/1983 | Marcoux | |
| 4,441,093 A | 4/1984 | Okazaki | |
| 4,486,804 A | 12/1984 | Watson et al. | |
| 4,527,144 A | 7/1985 | Arikawa | |
| 4,652,848 A | 3/1987 | Hundrieser | |
| 4,715,261 A | 12/1987 | Goldstein et al. | |
| 5,153,805 A | 10/1992 | Tennant et al. | |
| 5,192,937 A | 3/1993 | Lee | |
| 5,280,262 A | 1/1994 | Fischer | |
| 5,550,527 A | 8/1996 | Lee | |
| 5,563,570 A | 10/1996 | Lee | |
| 5,600,295 A | 2/1997 | Kaufmann | |
| 5,612,662 A | 3/1997 | Drekmeier et al. | |
| 5,708,553 A | 1/1998 | Hung | |
| 5,770,993 A | 6/1998 | Miyazawa et al. | |
| 5,831,507 A | 11/1998 | Kasamatsu et al. | |
| 5,896,080 A | 4/1999 | Chen | |
| 5,982,270 A | 11/1999 | Wolfe et al. | |
| 6,348,851 B1 | 2/2002 | Wyser et al. | |
| 6,445,277 B1 | 9/2002 | Ishikawa et al. | |
| 6,746,496 B1 * | 6/2004 | Kravitz | B01J 7/02 422/162 |
| 7,023,674 B2 | 4/2006 | Gross et al. | |
| 7,345,570 B2 | 3/2008 | Kawanishi | |
| 7,385,474 B2 | 6/2008 | Kawanishi | |
| 7,794,886 B2 | 9/2010 | Adams et al. | |
| 7,832,433 B2 | 11/2010 | Curello et al. | |
| 7,864,024 B2 | 1/2011 | Schlenker et al. | |
| 7,896,934 B2 | 3/2011 | Curello et al. | |
| 8,002,853 B2 | 8/2011 | Curello et al. | |
| 8,289,122 B2 | 10/2012 | Matthiesen et al. | |
| 2002/0155330 A1 | 10/2002 | Tanaka | |
| 2004/0146754 A1 | 7/2004 | Arthur et al. | |
| 2004/0212965 A1* | 10/2004 | Ishii | H01L 23/473 361/709 |
| 2004/0214056 A1 | 10/2004 | Gore | |
| 2005/0030823 A1* | 2/2005 | Tsuyuno | H01L 23/4951 365/232 |
| 2005/0058865 A1* | 3/2005 | Thompson | H01M 8/0258 429/429 |
| 2006/0273876 A1 | 12/2006 | Pachla et al. | |
| 2007/0036711 A1 | 2/2007 | Fisher et al. | |
| 2007/0243431 A1 | 10/2007 | Zhu et al. | |
| 2007/0277436 A1 | 12/2007 | Jones et al. | |
| 2009/0001816 A1 | 1/2009 | Tarter | |
| 2009/0017348 A1* | 1/2009 | Kelly | C01B 3/065 429/416 |
| 2009/0075132 A1 | 3/2009 | Gil et al. | |
| 2010/0028751 A1 | 2/2010 | Kubota | |
| 2010/0033295 A1 | 2/2010 | Kent et al. | |
| 2010/0080735 A1 | 4/2010 | Zimmermann | |
| 2010/0226829 A1 | 9/2010 | Horiguchi et al. | |
| 2010/0247425 A1 | 9/2010 | Scattergood et al. | |
| 2011/0177404 A1 | 7/2011 | Hung et al. | |
| 2011/0244344 A1* | 10/2011 | Spoto | C01B 3/065 429/421 |
| 2011/0253070 A1* | 10/2011 | Haring | C25B 1/04 123/3 |
| 2012/0194315 A1 | 8/2012 | Matthiesen et al. | |
| 2012/0194958 A1 | 8/2012 | Matthiesen et al. | |

FOREIGN PATENT DOCUMENTS

| | | |
|---|---|---|
| CN | 1958438 A | 5/2007 |
| CN | 101421031 A | 4/2009 |
| DE | 3533385 C1 | 4/1986 |
| EP | 1443581 A2 | 8/2004 |
| TW | 200414587 A | 8/2004 |
| WO | WO 2013/122849 A1 | 8/2013 |

OTHER PUBLICATIONS

Taiwan Patent Application No. 102110316; Office Action and Search report; dated Sep. 21, 2016; 6 pages.
International Search Report dated Jun. 10, 2013, issued in International Patent Application PCT/US2013/030148.
European Patent Application No. 13764321.9; Partial Suppl. Search Report; dated Jul. 10, 2015; 7 pages.
European Patent Application No. 13764160.1; Partial Supplementary Search Report; dated Nov. 3, 2015; 6 pages.
European Patent Application No. 13764321.9; Extended Search Report; dated Oct. 27, 2015; 13 pages.
International Patent Application No. PCT/US2013/030263; Int'l Search Report; dated Jun. 18, 2013; 2 pages.

* cited by examiner

HYDROGEN PRODUCING FUEL CARTRIDGE AND METHODS FOR PRODUCING HYDROGEN

CROSS-REFERENCE TO RELATED APPLICATIONS

This application is a Divisional Application of U.S. Utility Patent Application No. 14/521,175, filed Oct. 22, 2014, which is a National Stage Application of PCT/US2013/030148, filed Mar. 11, 2013, which claims priority to U.S. Provisional Application 61/614,868, filed Mar. 23, 2012, the contents of which are incorporated herein by reference in their entirety.

BACKGROUND

1. Field

This disclosure relates to hydrogen producing fuel cartridges, and methods for producing hydrogen from these cartridges.

2. General Background

World-wide commercial use of fuel cell powered host devices, particularly portable devices. A non-exclusive list of potential host devices include, but are not limited to, computer peripherals, mobile phone peripherals, mobile phones, personal music players, laptops, notebooks, tablet, gaming devices, personal digital assistants (PDAs), and battery chargers. A fuel cell power system can either be located inside the host device or can be connected to the host device using suitable means. In either case, a means to provide fuel to the power system is required. An example of one such means is the use of fuels packaged in cartridges (packaged fuel) in predetermined amounts to satisfy the volume, weight and run time requirements of the host device, use profile of the host device, and regulatory requirements associated with the host device. For the sake of simplicity, a fuel cell power system is considered to comprise of a fuel cell subsystem that includes the fuel cell or a multiplicity of fuel cells in the form of a fuel cell stack, fluid, and power management means, a process controller, and the fuel cartridge. The fuel cartridge is connected to the fuel cell subsystem system using a connector or coupling.

Hydrogen can be produced by hydrolysis of chemicals such as sodium borohydride. Fuel cartridges for producing hydrogen from sodium borohydride are disclosed in U.S. Pat. Nos. 7,794,886, 7,832,433, 7,896,934 and 8,002,853. Hydrogen production from hydrolysis is characterized by short start-up times and good control of hydrogen production rates. However the need to use water or other aqueous solutions decreases the hydrogen storage capacity of these fuel cartridges. In addition, once activated to support a fuel cell system, hydrogen continues to evolve from these cartridges requiring a buffer to store this hydrogen in the event the fuel cell system is shut-off.

Hydrogen may be produced via thermolysis of chemicals such as ammonia borane and alane (aluminum hydride). For example, US2010/0226829A1 describes a hydrogen generator that produces hydrogen by the decomposition of ammonia borane. In a thermolysis fuel cartridge, hydrogen is produced by supplying heat to the chemicals contained in the fuel cartridge.

Accordingly, it is a desideratum to develop designs, components and methods to improve thermal management and hydrogen production efficiencies in thermolysis fuel cartridges for use in fuel cell power systems.

DESCRIPTION

According to some aspects of exemplary implementation of the disclosure, disclosed herein is a fuel cartridge comprising a frame and folded PCB forming a box sealed together forming a substantially hydrogen impermeable enclosure; having a plurality of fuel regions affixed to an inner wall of the PCB are one or more switching thermal control mechanisms; electrically connected to said switching thermal control mechanisms are resistance heater elements; fuel within each of the plurality fuel regions; a hydrogen output fluidly communicating from inside the box to outside; a power connection electrically connected to said thermal control mechanisms communicating from outside the box to inside the box. In some instances the fuel is comprised of at least one of sodium borohydrate, alane or ammonia borane. In some instances inert materials such as alumina or other ceramics are added to the fuel to improve thermal conductivity. In some instances one or more bulkheads separate fuel regions. In some instance the heating elements are printed circuits that act as heaters.

According to some aspects of exemplary implementation of the disclosure, disclosed herein is a fuel cartridge comprising a frame and folded PCB forming a box sealed together forming a substantially hydrogen impermeable enclosure; having a plurality of fuel regions affixed to an inner wall of the PCB are one or more switching mechanisms and thermal control mechanisms; electrically connected to said switching thermal control mechanisms are resistance heater elements; fuel within each of the plurality fuel regions; a hydrogen output fluidly communicating from inside the box to outside; a power connection electrically connected to said thermal control mechanisms communicating from outside the box to inside the box. In some instance the fuel cartridge further comprising malleable regions of the PCB whereby the PCB may be folded. In some instance the heating elements are printed circuits that act as heaters.

According to some aspects of exemplary implementation of the disclosure, a method of producing hydrogen fuel is taught with switching on at least one of a plurality of heating elements within a substantially hydrogen impermeable enclosure to thermally activate a fuel to produce gaseous hydrogen; communicating electronically from the exterior of the enclosure with the heating elements via a power connection; and, outputting hydrogen via a fluid connection output. In some instance the switching to actuate heating elements is done in series. In some instance the switching to actuate heating elements is done in parallel.

According to some aspects of exemplary implementation of the disclosure, a fuel cartridge comprising: a PCB with affixed heater elements affixed to thermal control and switching mechanisms; an enclosure sealed to the top of the PCB together forming a substantially hydrogen impermeable enclosure; within the enclosure a matrix of fuel compartment; within the matrix fuel; a communications input output extended from the PCB bottom whereby at least one of electrical power, analog and digital information may be provided via conductive pathways to thermal control and switching mechanism and resistance heater elements; one or more hydrogen outputs through the enclosure; and, one or more manifolds to collect the hydrogen produced from the fuel inside the enclosure and provide it to said hydrogen output. In some instances the fuel cartridge further comprising at least one bulkhead separating fuel compartments. In some instances the fuel compartments are thermally insulated from each other. Some switching mechanism include a magnetic read switch, percussion switch, over voltage, thermal lag, heater bank, altered resistive, reflective impedance, microprocessors, and thermal activate switch.

According to some aspects of exemplary implementation of the disclosure, a thermal active switch comprising: a low melting point first portion of non-molten solder thermally connected to a resistance heater element; a first conductive pathway connected to the first portion of solder; a non-molten soldered connection area of the first portion draped over an angled divider; a second conductive pathway; and a second portion of non-molten solder connected to the second conductive pathway. When switching on the low melting point first portion of solder is heated and made molten by the resistance heater element and flows down the angled divider thereby conductively connecting the second portion of non-molten solder with the molten first portion and connecting the first and second conductive pathways.

According to some aspects of exemplary implementation of the disclosure a method of thermal switching, the method comprising: placing a low melting point first portion of non-molten solder on a first conductive pathway in thermal connect to a resistance heater element; draping a portion of the non-molten solder draped over an angled divider; placing a second portion of non-molten solder connected to the second conductive pathway; and, heating the first portion of non-molten solder until it is molten and flowing it into contact, via the angled divider, with the second portion of non-molten solder. In some instances the surface of the angled divider surface of which repels molten solder. In some instances the molten solder cools and solidifies.

All callouts in the attached figures are hereby incorporated by this reference as if fully set forth herein.

It should be appreciated that, for simplicity and clarity of illustration, elements shown in the figures have not necessarily been drawn to scale. For example, the dimensions of some of the elements are exaggerated, relative to each other, for clarity. Further, where considered appropriate, reference numerals have been repeated among the Figures to indicate corresponding elements. While the specification concludes with claims defining the features of the present disclosure that are regarded as novel, it is believed that the present disclosure's teachings will be better understood from a consideration of the following description in conjunction with the figures, in which like reference numerals are carried forward. All descriptions and callouts in the figures are hereby incorporated by this reference as if fully set forth herein.

FURTHER DESCRIPTION

Devices including PEM fuel cells require hydrogen fuel to generate electricity. Hydrogen can be stored as-is or can be produced on demand. In certain applications, it is useful to have replaceable hydrogen supplies which may be supplied as pressurized gas in tanks (also known as a container, tank, canister or cartridge) or hydrogen stored in metal hydrides, in slurries or in other substrates. Hydrogen may also be supplied in the form of a precursor chemical in the form of a chemical hydride. The latter is particularly suited for portable power systems, whereby the chemical stored in the tank is reacted using suitable methods, as needed, to produce hydrogen on-demand.

High purity hydrogen is preferred when used in a PEM fuel cell. Purity above 99% is preferred. Hydrogen above about 99.9% purity is more preferred and hydrogen above about 99.99% purity is most preferred. Assuring proper purity of hydrogen is important as impurities in a hydrogen fuel supply may damage or degrade the performance of the PEM fuel cell. Deterring the use of an unauthorized or unauthenticated hydrogen fuel source is one means of insuring that the end user can rely on the stable and production of power from a PEM fuel cell system. This also enables monitoring and disposal of counterfeit hydrogen supplies.

FIGS. 1A-1D show aspects of an exemplary implementation of a thermolysis fuel cartridge 1. The device is preferably formed on a flexible substrate such as plastic, laminate, PCB 5, and the like. The device is formed, shaped, and/or predisposed, to fold or nest into a specific volumetric shape. In some instances that shape is generally a cartridge, sachet, or box structure. A frame 6 of a size and configuration to surround the edges of said PCB 5, and to fit over a connector tab cover 7 is used. The frame 6 is generally a "C" or "U" shaped channel with an outer wall 8 and an inner wall 9. Said cover may have a boundary of adhesive such as high temperature silicone adhesive to form a gasket or border to control, direct, or limit fluid communications inside the cartridge.

Figure 1A:
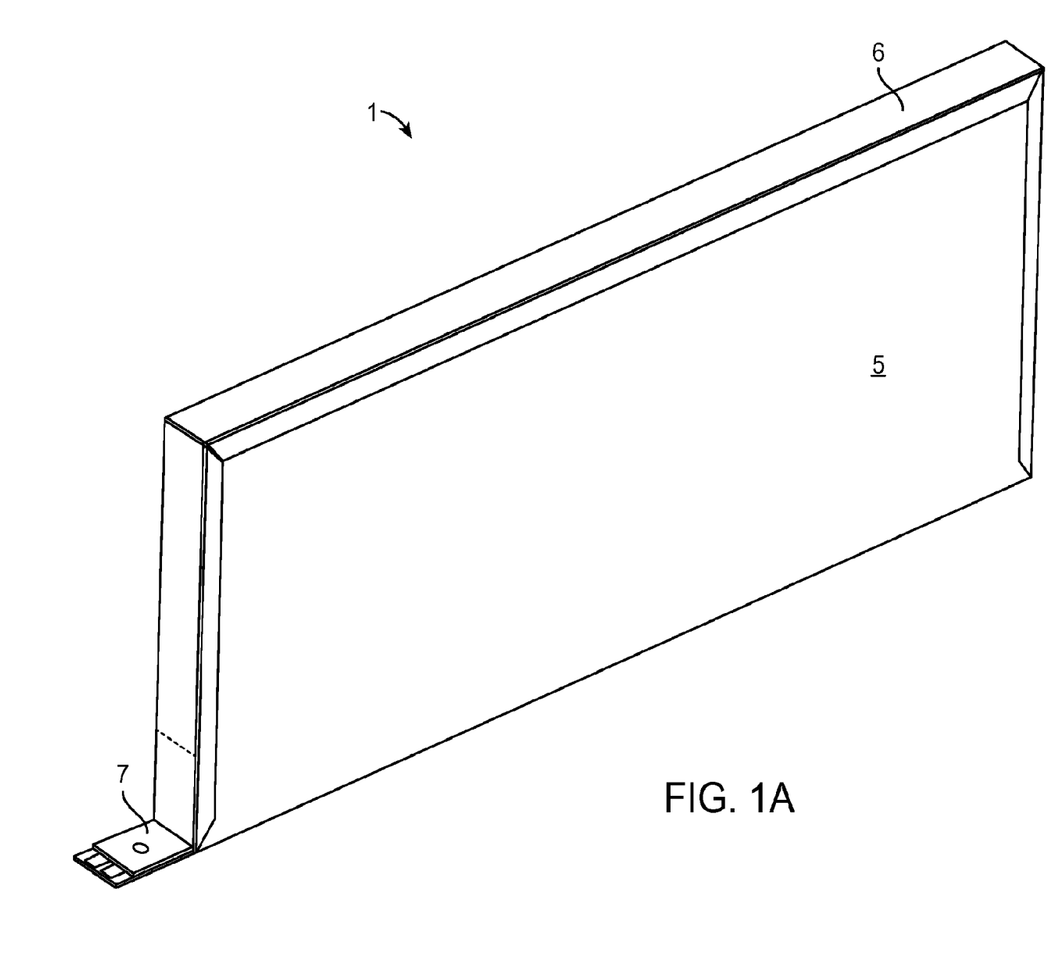
FIGS. 1A, 1B, 1C and 1D are component and assembled views of a sachet type thermolysis fuel cartridge.
Figure 1B:
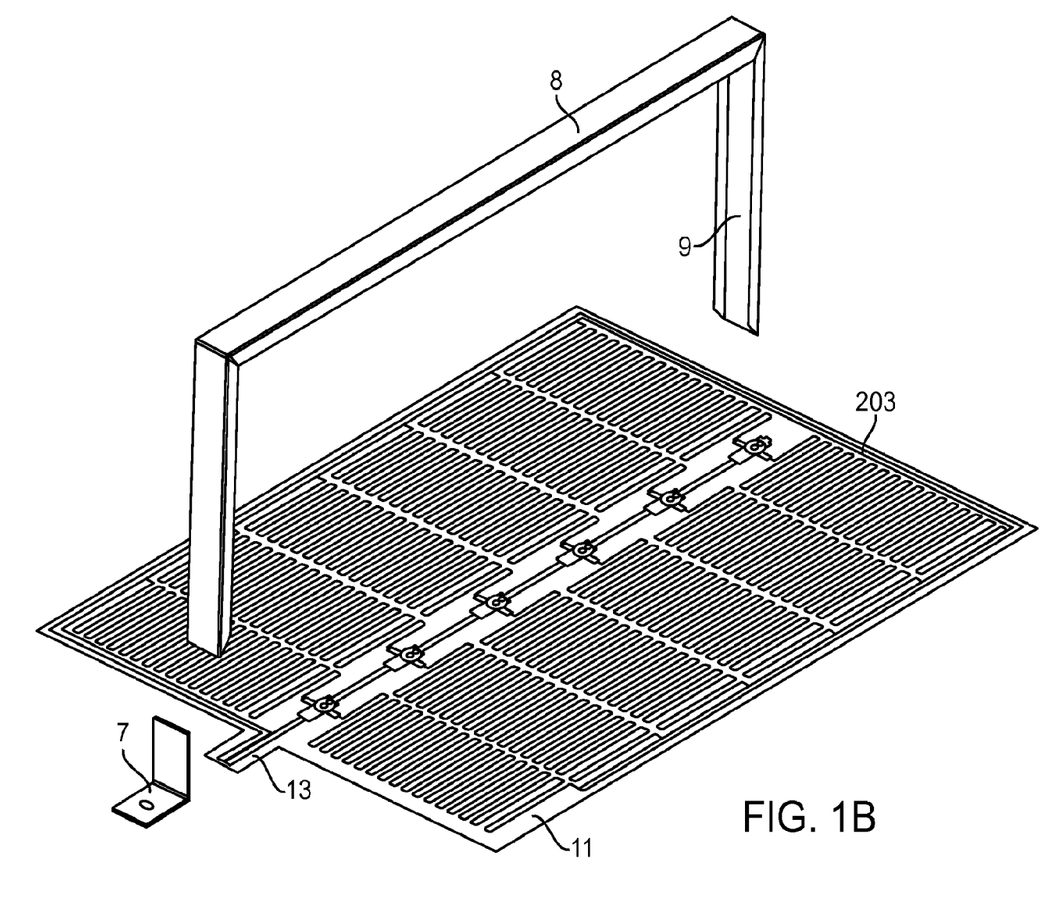
Figure 1C:
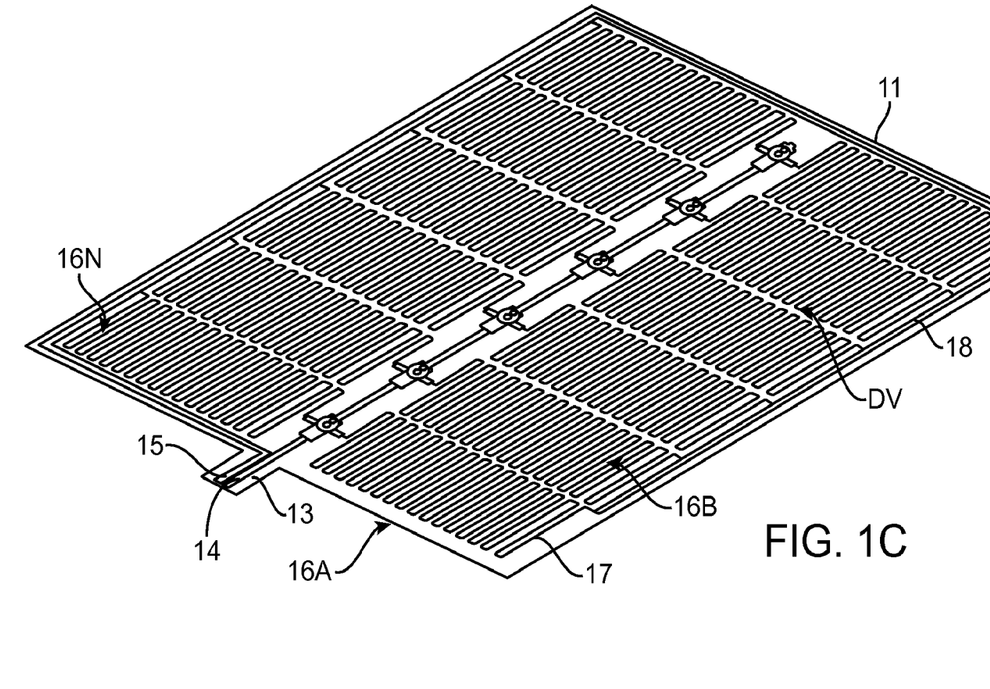
Figure 1D:
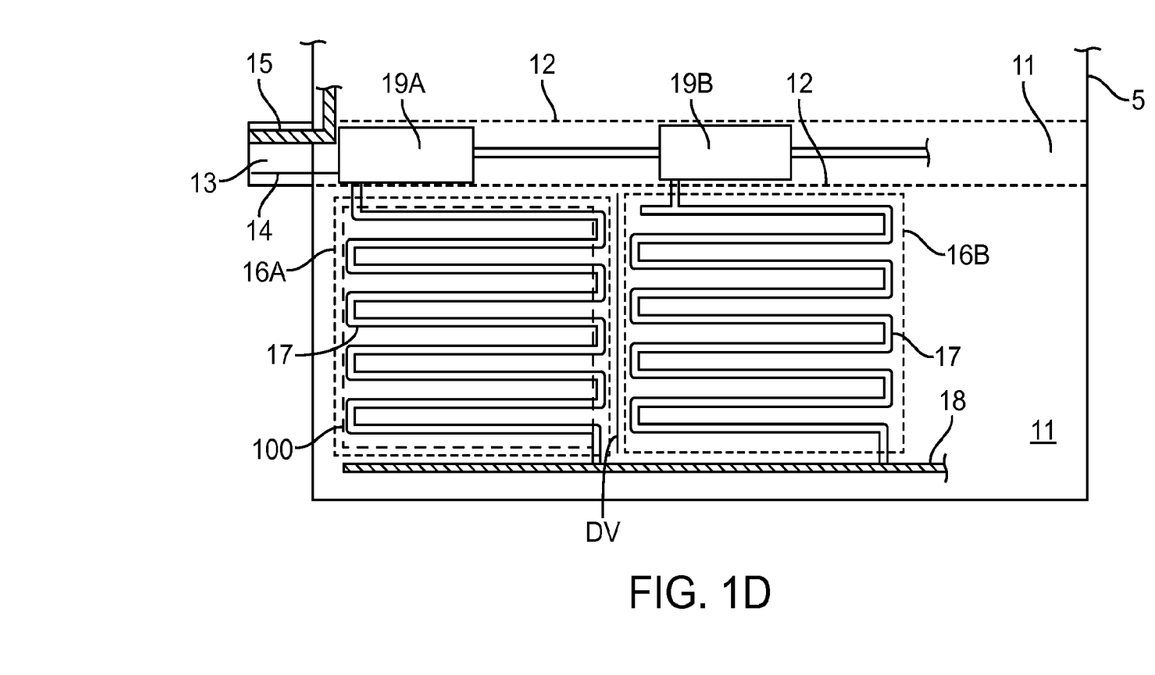

Contained within this cartridge 1 is a fuel, either in a powder or compressed form (not shown). Said fuel for hydrolysis includes but is not limited to sodium borohydride. The cartridge 1, once folded or formed into a volumetric structure is sealed visa a vie said frame 6 and tab cover 7 adequately to resist all but negligible hydrogen leakage. Sealing methods include adhesive bond, membranes, covers, epoxy, coating, wrapping, sonic welds, welds, high temperature silicone based adhesive to withstand the operating pressures or a combination thereof to provide substantially gas tight containment of fuel. Shown in FIG. 1D is a partial PCB 5 with malleable regions 12 whereby the board may be folded or bent to form the box shape in cooperation with the frame 6. The malleable area may be a flexible area of epoxy, silicone, rubber, plastic or composite which is both a barricade to hydrogen and flexible.

A connector, shown as tab 13 projecting from the structure provides a power connection 14 which allows electrical power to be supplied to the device. Said tab may also be a separate part added to the device. In some instances the power connection is a conductive plug, jack or wire. In other instances the power connection may be via induction. Also shown on tab 13 is a fluid communication pathway whereby hydrogen produced by the device may be output 15.

The power connection 14 feeds electrical power from the exterior of the enclosure to one or more heater for fuel regions 16A-16N. Each heating region contains heating elements 17 such as resistance heaters which are electronically actuated. A conduit 18, either separate or bundled with said heating element, is provided to extract, acquire, obtain or otherwise direct hydrogen fuel produced by said thermolysis device which is output via said hydrogen fuel feed output 15. Optionally, a bulkhead, barrier or divider "DV" is used, which has thermal properties to control, limit or reduce activation of more fuel regions 16A-N via heating elements 17 and the liberation or production of hydrogen therefrom.

Heat needs to be supplied to the fuel 100 in the cartridge to produce hydrogen via decomposition of the fuel. Heat required for start-up (to heat the fuel from ambient temperature to 100-170° C.) is produced by supplying power, such as from a power cable, a rechargeable battery, or a primary battery, to a resistive heating element.

In aspects of at least one exemplary implementation, the fuel 100 in powdered form is mixed with inert materials such as alumina or other ceramics to improve thermal conductivity. In some instances the fuel is admixed with metal powders such as aluminum to improve thermal conductivity. A mixture, although not essential, may improve heat distribution and improve conversion of the fuel to hydrogen.

In aspects of at least one exemplary implementation, the fuel 100 powders either in native form or in admixed form is compacted into tablet or pellet form. These tablets or pellets can be fired using dedicated heating elements as needed to produce hydrogen.

One or more thermal control mechanisms 19A and 19B within the cartridge or sachet regulate each heating element 17 i.e. act as on/off or heat/temperature control. The inner walls 11 of the PCB contain printed circuits 203 that act as heaters. Placing said thermal control mechanism 19A and 19B in said cartridge can be used to minimize external communication to the fuel.

FIGS. 2 and 3A-3C illustrate aspects of exemplary implementations of fuel cartridges. Forming a fuel cartridge 25 is a support plate or bottom such as a PCB 30, with a top 31 and bottom 32. Said PCB is suitable for supporting one or more thermal control and switching mechanism 40 and resistance heater elements 50 connected thereto. The PCB board has good thermal properties, and is sufficient for supporting electrical components. An array or matrix 60 of fuel compartment 62A-N, each preferably thermally insulated from each other, are attachable to the PCB 30.

Figure 2:
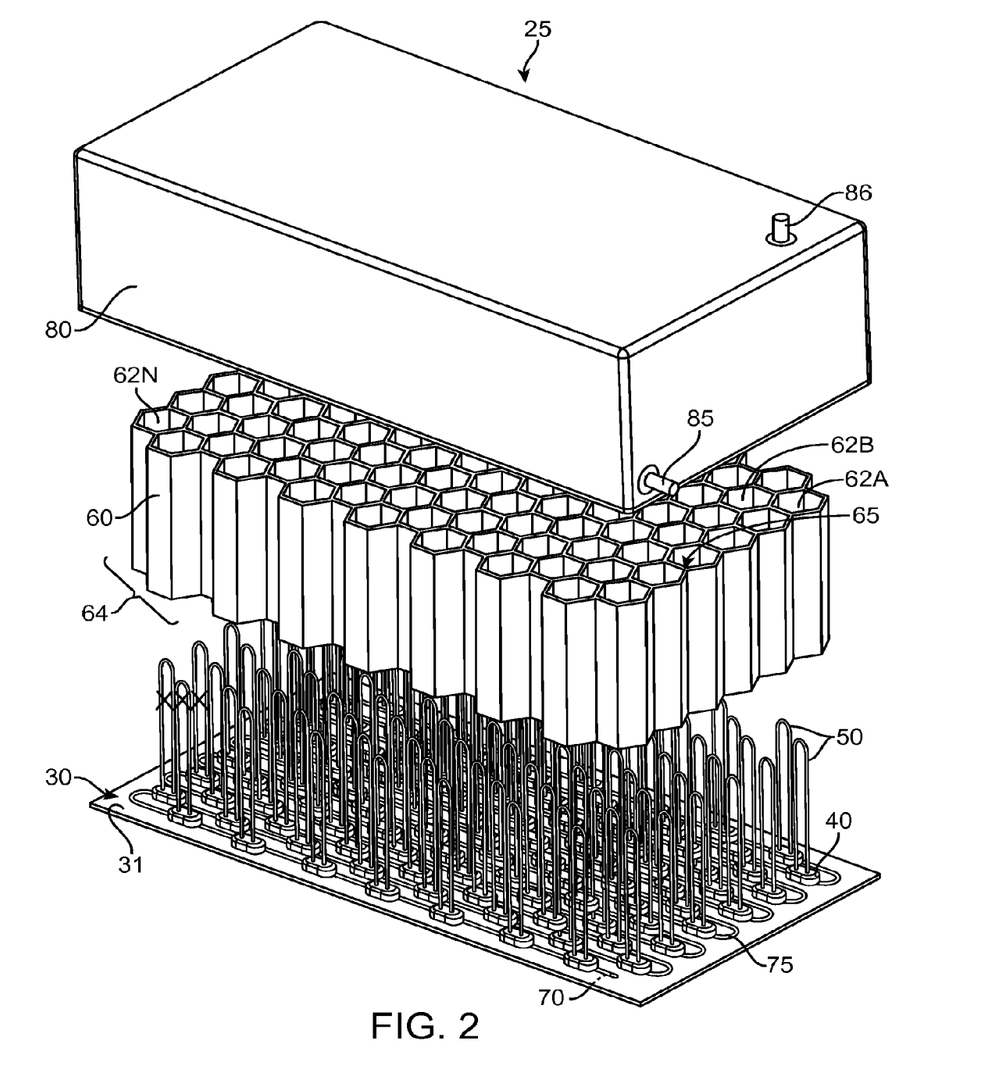
FIG. 2 is a component view of heating elements and a matrix of compartments for a thermolysis fuel cartridge.
Figure 3A:
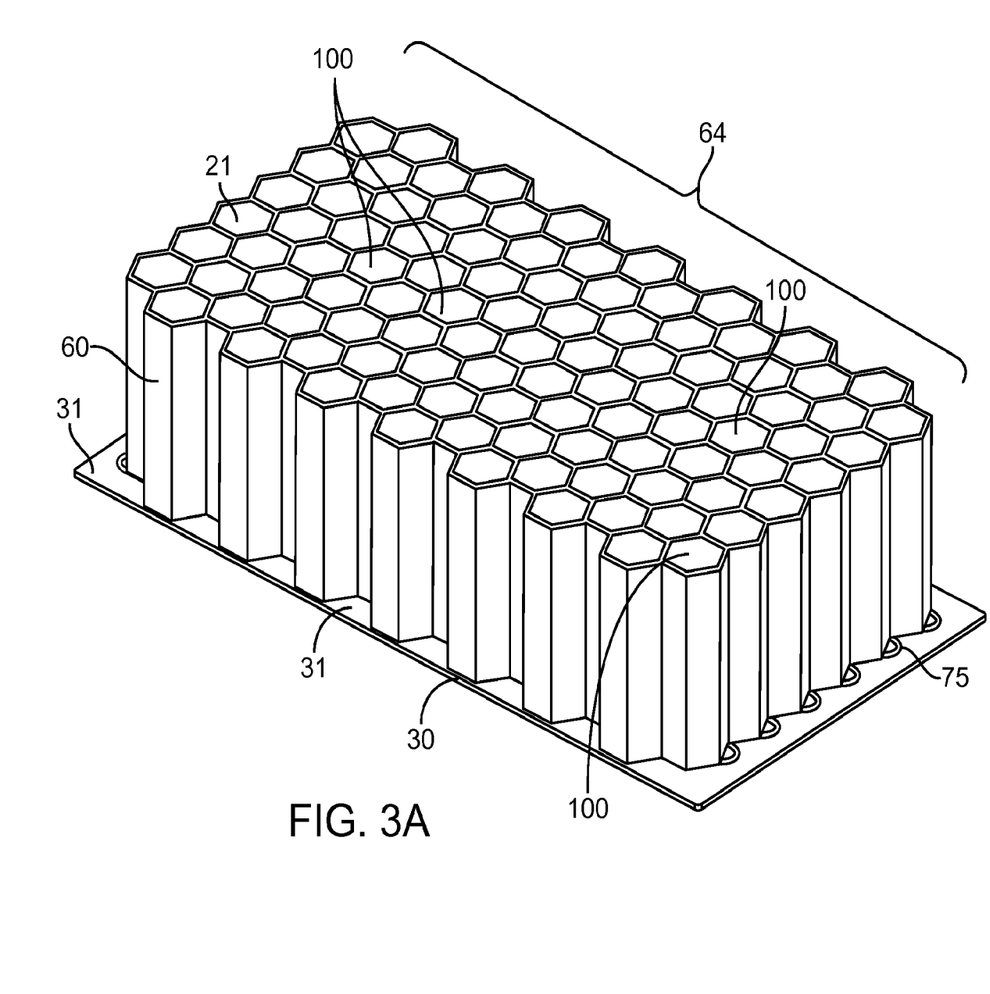
FIG. 3A is a view of compartmentalized fuel filled elements for a thermolysis fuel cartridge.

Thermal insulation provides better performance and reduce waste of fuel but is not necessary in all instances. The compartments may be a series of open, generally tubular structures, which are tightly packed together. Alternatively, the compartments 62A-N may be generally tubular channels yet have one or more shared wall or boundaries. The matrix 60 has an outer boundary 64, or perimeter wall structure. The honeycomb like structure having a polygonal shape is shown is an example only and is not intended to be limiting. Other structural arrangements can be easily incorporated. The number of compartments is also meant to be used as a guide to the eye only. Any number of compartments can be utilized depending on the amount of hydrogen that is required for a given fuel cell power application. Internal walls, barriers or bulkhead (65) physically separate compartments. In some instances, said separation also provides some thermal separation of compartments from each other. Extended from the PCB 30 is a communications I/O (input output) 70 wherein electrical power and/or analog or digital information may be provided to the PCB 30 and distributed via conductive pathways 75 to thermal control and switching mechanism 40 and resistance heater elements 50 connected thereto.

Figure 3B:
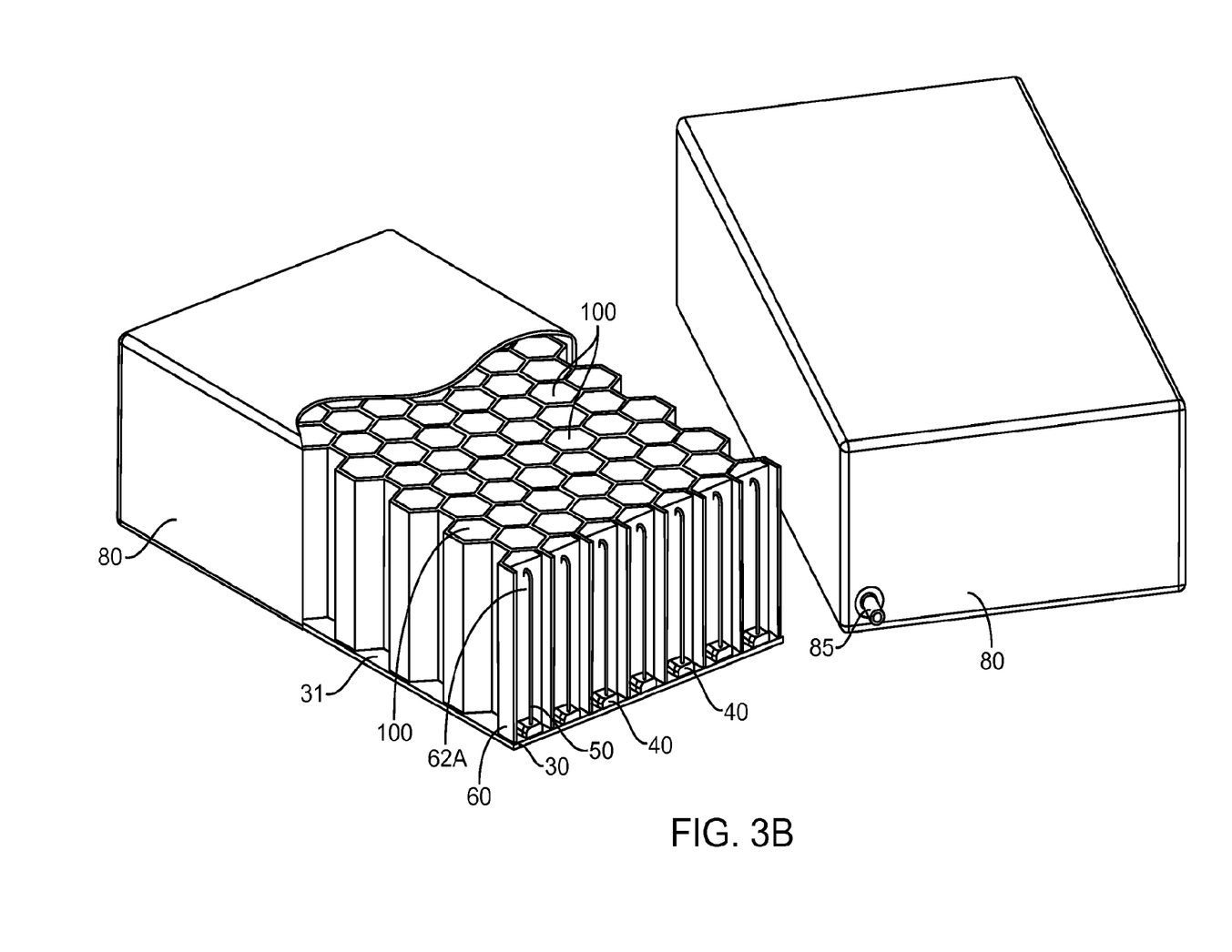
FIGS. 3B and 3C are a perspective view and a cut away view of a thermolysis fuel cartridge.
Figure 3C:
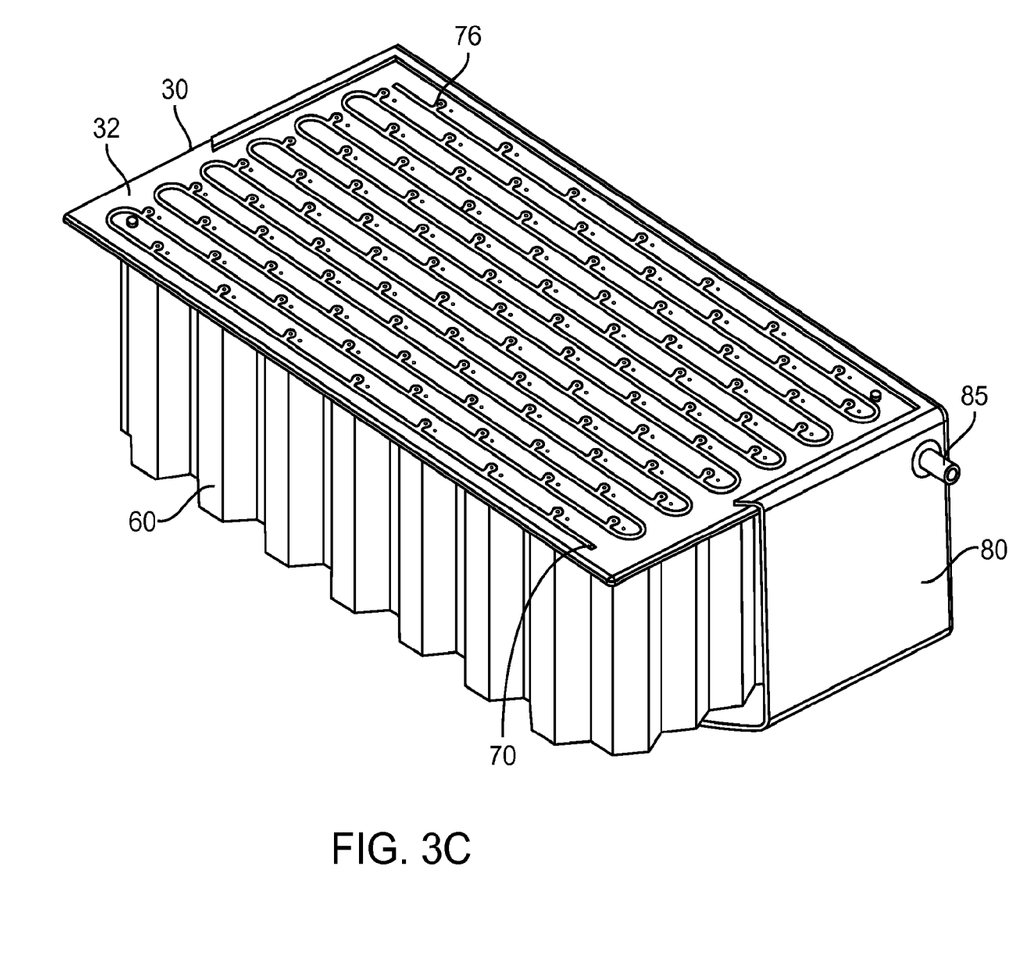

In some instances, prior to filling the compartments with fuel 100, the matrix 60 has an open top and an open bottom for said compartments. Also, prior to filling the compartments with fuel one of the top and bottom is at least partially closed off, whereby fuel may be fixed in place. Closing may be mounting the top or bottom of the matrix 60 to a cover or the top 31 of a PCB 30. The mounting should include fixing and/or sealing the matrix 60 to the PCB 30. After fuel is added to compartments 62A-N, said compartments are sealed off. Both the top and bottom ends of the matrix should be sealed adequately to prevent more than negligible leakage of hydrogen gas. Sealing may be via an enclosure 80, a cover, a layer of epoxy, substrate, also structural support and sealing may include a pressed metallic case or the like, and/or a combination of the above. The enclosure should include one or more hydrogen outputs 85/86 and a manifold 88 or other pathway to collect the hydrogen produced from the fuel 100 and provide it to said hydrogen output(s) 85/86. The bottom 32 of the PCB 30 contains a conductive pathway volumetric and a jack or plug for input/output 70 of power and/or control of switching.

The device provides multiple heater elements in a switchable configuration. In some instances the switching may be serial. In other instances switching of two or more heater elements may be in parallel. Switching patterns may be used to isolate switched compartments from another switched compartment. In some instances, switching patterns may be used to optimize or improve thermal control. For example, an activated compartment may be adjacent to one or more spent compartments, or an active compartment is not fired when next to a compartment which was recently fired or has too great a temperature.

A switching mechanism may be preconfigured for switching the heater elements in a preselected sequence. A switching mechanism may be reconfigurable for switching the heater elements in a desired sequence or in response to a changing variable such as hydrogen pressure, temperature or demand.

To produce hydrogen from the fuel 100 each compartment 62A-N includes a resistance heater elements 50, and thermal control and switching mechanism 40. The heater elements could be Positive Temperature Coefficient (PTC) controlled or thermally switched using simple Bimetallic or Nitinol (memory metal) reeds or Permanent Ni—Zn magnets operating around its Curie temperature within the cartridge. As an alternative, the compartments can be individually assembled instead of being part of the structure.

The fuel in each compartment can be fired on demand as needed.

When a cell or compartment starts to become exhausted, an external transducer (not shown) may be utilized to detect a drop in hydrogen production and one of the following methods could be employed to switch resistance heater banks:

(i) Magnetic read switches are activated within the cartridge by a traversing permanent magnet or a switched electro magnet external to the cartridge;

(ii) Integrated Percussion switches that are only sensitive to shock once at the operating temperature (the live cell/compartment) are activated by a percussive actuator acting on the complete cartridge housing;

(iii) An over voltage condition could be used to disable the currently operating heater element and switch to a new cell or compartment;

(iv) Thermal lag could be employed to effectively time the operating cell or compartment. This could be done by including a partial thermal barrier between the heater element and the controlling latching reed switch;

(v) Heater bank switching could be achieved by internal switches using the destabilization of adhesives or the liquid transition of low melt alloys. These switches would stay in the triggered state on solidification as the cell cools;

(vi) The altered resistive state of the fuel once exhausted could be used to switch heater banks;

(vii) Reflective impedance of the heater circuit could be analyzed without compromising the thermal efficiency of the insulation with extra communication paths and used to understand the reactive state of the fuel compartments/cells;

(viii) microprocessors, The cascading of the actuation of the fuel within each compartment or cell within the cartridge or sachet could provide a lower cost approach to the thermal control of the fuel decomposition and reduce any physical communication required; and, (ix) A thermal active switch: one of a thermally activated switching junction on a PCB or thermal switching mechanism within a surface mount PCB component. Employing low melt alloy solder, solder repelling surfaces and influencing geometries.

Cartridges could be thermally isolated from one another and banked within the insulated housing of the device to maximize the thermal efficiency of the unit and to allow exhausted cartridges to be ejected or swapped once cooled.

Figure 4A:
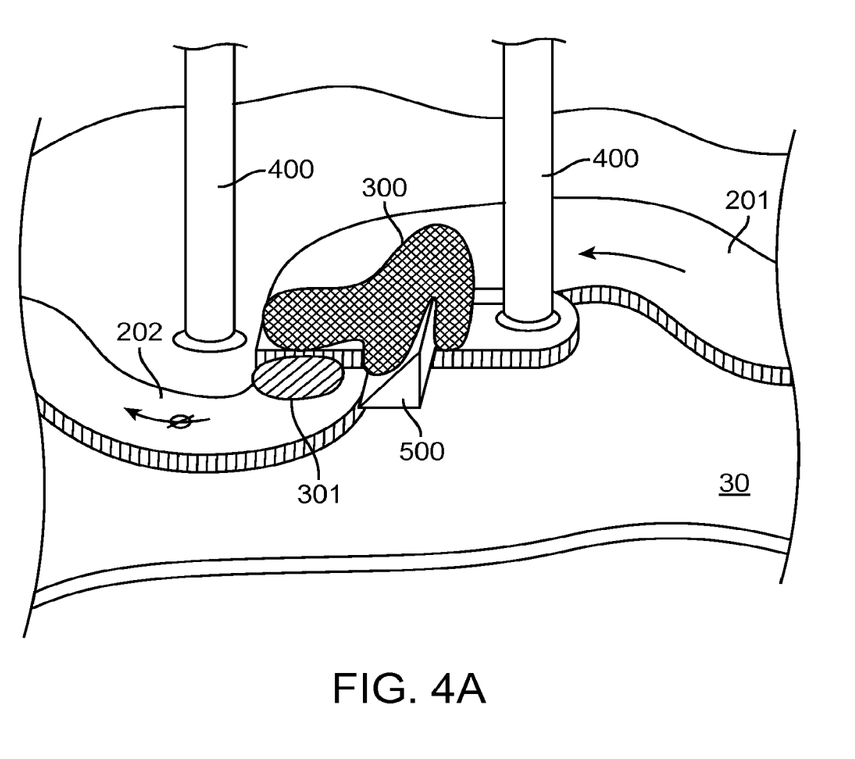
FIGS. 4A and 4B show a sequence of switching of heater elements.
Figure 4B:
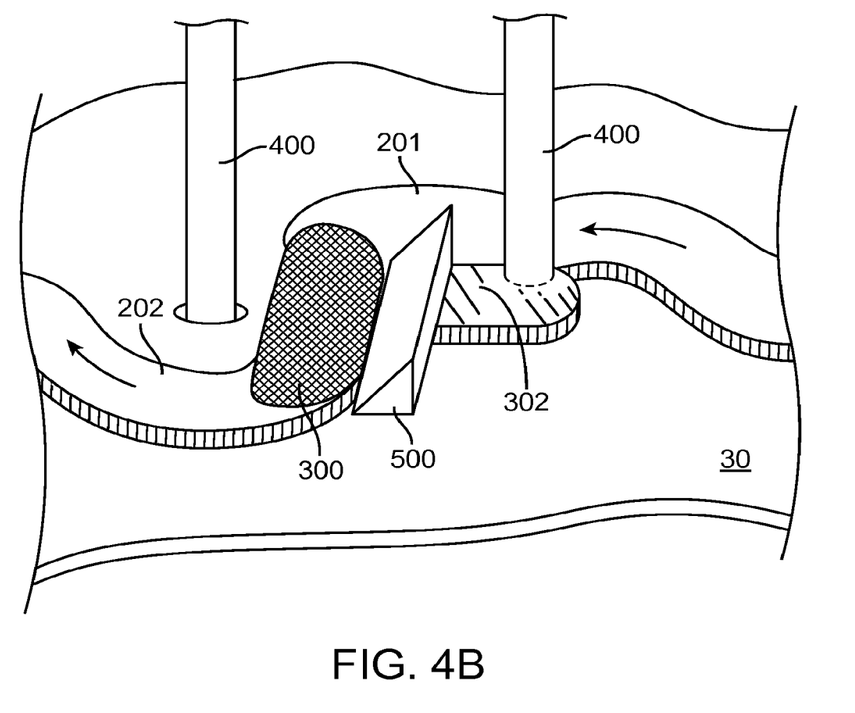
Figure 5A:
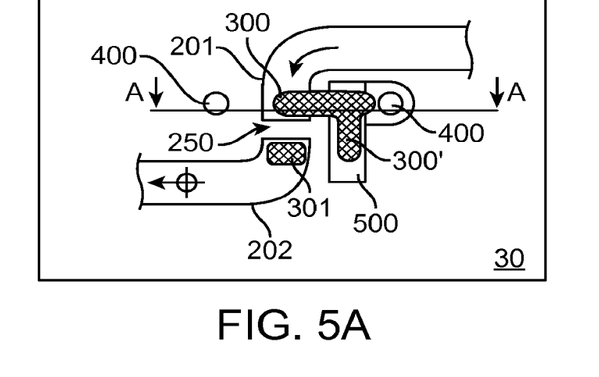
FIGS. 5A to 5C show a plan and side view of sequential heater element switching and a cutaway view of FIG. 5A.
Figure 5B:
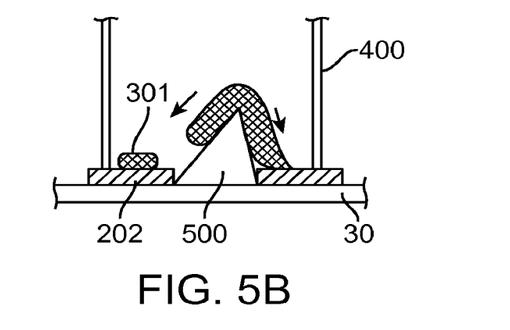
Figure 5C:
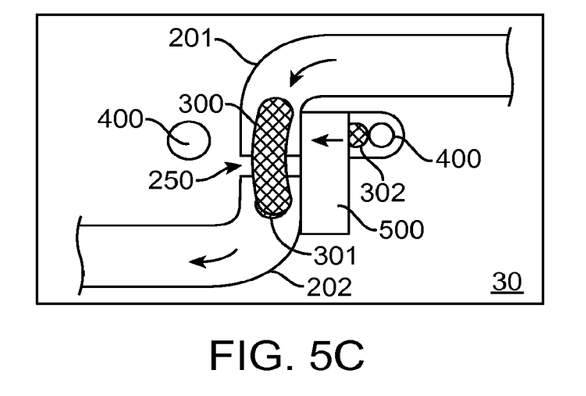

FIGS. 4A and 4B show a perspective view of a sequence wherein heater elements are sequentially turned on and off. FIG. 5A shows a plan view of FIG. 4A, and FIG. 5B is a cut away, along the line of "A"-"A" of FIG. 5A. FIG. 5C is a plan view of FIG. 4B.

The PCB 30 provides support for electrical pathways. Electrical connection is not made and hence, power does not flow from a first conductive path 201 to a second conductive path 202.

A soldered joint/junction 250 is located close to the resistance heater element needing to be controlled. In its first stage of operation (FIG. 4A) the low melting point first portion of non-molten soldered 300 engages the resistance heater element 400 in the circuit. A non-molten soldered connection 300' is draped over a plastic, coated metallic or ceramic divider 500. It is preferred, but not required, that the surface of which naturally repels the solder once molten. The geometry of the divider may be used to urge or promote displacement the solder pool (when molten) in a specific direction.

Those of ordinary skill in the art will recognize that various combinations of alloys may be used to allow the melting point to be accurately controlled between 70 and 300 degrees Centigrade, and those variations are within the scope of this disclosure.

There are many ways to activate the "switchover", one is to slightly over power the heater element 400 and bring it to the solder trigger temperature. In some instances this may be timed with monitoring hydrogen pressure of the liberated/generated hydrogen. Another "switchover" procedure is to build a thermal delay between the heater element 400 and the thermal switch by introducing a partially insulating barrier. Another "switchover" procedure is to utilize altered thermal conductivity of the fuel. As the fuel is expended, it chemically converts to a metallic state as the reaction is completed.

As the switch reaches the trigger temperature, the alloy melts and two things simultaneously happen (See FIGS. 4B and 5C); the continuity with the resistance heater element 400 is broken as the solder 300 separates over the angled divider 500 and the next resistance heater element downstream along conductive pathway 202 is introduced into the circuit as the larger proportion of the molten pool of solder 300 is rejected by the angular repelling face of the divider and flows into the pool on the surface track connected to that element. A second portion of solder 301 on conductive second pathway 202 is positioned to accept the molten first portion of solder 300' as the solder joint/junction 250 is switched. The rejected solder 302 may pool near the heater element 400. The molten first portion of solder 300 quickly solidifies as the heater element 400 cools.

The disclosure provides thermal control in a cost effective package to support mass production and/or reduced costs. In some instances multiple fine heater elements wires can be placed within the various regions of fuel powder. This allows low volumes of fuel to be liberated at any one time without risk of over production, negating the need for multiple thermal measurements throughout the internal volume of the fuel core and complex control systems.

The solder joint/junction requires only two surface tracks on PCB to power the heaters compared to multiple tracks connecting multiple heaters and thermocouple/thermistor tracks.

In some instances to fine tune the system it may detect a voltage ripple at the trigger temperature as the connection starts to switch and momentarily reduce the supply voltage to allow the molten solder 300 to amalgamate. A switching mechanism (such as those described in FIGS. 1 and 2) may be surface mounted to the PCB or as an additional component or attached to the heater element.

While the method and devices have been described in terms of what are presently considered to be the most practical, it is to be understood that the disclosure need not be limited to the disclosed implementations. It is intended to cover various modifications and similar arrangements included within the spirit and scope of the claims, the scope of which should be accorded the broadest interpretation so as to encompass all such modifications and similar structures. The present disclosure also includes any and all implementations of the following claims.

Further, each of the various elements of the disclosure and claims may also be achieved in a variety of manners. This disclosure should be understood to encompass each such variation, be it a variation of an implementation of any apparatus implementations, a method or process implementations, or even merely a variation of any element of these.

Particularly, it should be understood that as the disclosure relates to elements of the invention, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this invention is entitled.

It should be understood that all actions may be expressed as a means for taking that action or as an element which causes that action.

Similarly, each physical element, disclosed, should be understood to encompass a disclosure of the action which that physical element facilitates.

Any patents, publications, or other references, mentioned in this application, for patent, are hereby incorporated by reference. In addition, as to each term used, it should be understood that, unless its utilization in this application is inconsistent with such interpretation, common dictionary definitions should be understood, as incorporated, for each term, and all definitions, alternative terms, and synonyms such as contained in at least one of a standard technical dictionary recognized by artisans and the Random House Webster's Unabridged Dictionary, latest edition, are hereby incorporated by reference.

Finally, all references, listed in the Information Disclosure Statement or other information statement filed with the application, are hereby appended and hereby incorporated by reference; however, as to each of the above, to the extent that such information or statements incorporated by reference might be considered inconsistent with the patenting of this/these invention(s), such statements are expressly not to be considered as made by the applicant(s).

In this regard, it should be understood that, for practical reasons, and so as to avoid adding potentially hundreds of claims, the applicant has presented claims with initial dependencies only.

Support should be understood to exist, to the degree required under new matter laws, —including but not limited to United States Patent Law 35 USC 132 or other such laws, —to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular exemplary implementations, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative exemplary implementations.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

The invention claimed is:

1. A fuel cartridge (1) comprising:
a frame (6) and folded PCB (5) forming a box sealed together forming a substantially hydrogen impermeable enclosure;
a plurality of fuel regions (16A-N)
affixed to inner wall (11) of the PCB are one or more switching thermal control mechanisms (19A and 19B);
electrically connected to said switching thermal control mechanisms are resistance heater elements (17);
fuel (100) within each of the plurality fuel regions;
a hydrogen output (15) fluidly communicating from inside the box to outside; and,
a power connection (14) electrically connected to said thermal control mechanisms communicating from outside the box to inside the box.

2. The fuel cartridge of claim 1, wherein said fuel is comprised of at least one of sodium borohydrate, alane or ammonia borane.

3. The fuel cartridge of claim 1 wherein inert materials such as alumina or other ceramics are added to the fuel to improve thermal conductivity.

4. The fuel cartridge of claim 1, further comprising one or more bulkheads (DV) to separate fuel regions.

5. The fuel cartridge of claim 1, further comprising one or more switching mechanisms.

6. The fuel cartridge of claim 1, further comprising malleable regions (12) of the PCB whereby the PCB may be folded.

7. The fuel cartridge of claim 1, wherein the sealing is at least one adhesive bond, membrane, cover, epoxy, coating, wrapping, sonic weld, weld, high temperature silicone and will withstand the operating pressures to provide substantially gas tight containment of fuel.

8. The fuel cartridge of claim 1, wherein the heating elements are printed circuits (203) that act as heaters.

9. A hydrogen producing fuel cartridge (1) comprising:
a PCB (30) with affixed heater elements (50) affixed to thermal control and switching mechanisms (40);
an enclosure (80) sealed to the top (31) of the PCB together forming a substantially hydrogen impermeable enclosure;
within the enclosure a matrix (60) of fuel compartment (62A-N);
within the matrix fuel (100);
a communications input output (70) extended from the PCB bottom (32) whereby at least one of electrical power, analog and digital information may be provided via conductive pathways (75) to thermal control and switching mechanism and resistance heater elements;
one or more hydrogen outputs (85/86) through the enclosure; and,
one or more manifolds (88) to collect the hydrogen produced from the fuel 100 inside the enclosure and provide it to said hydrogen output.

10. The fuel cartridge of claim 9, wherein said fuel is comprised of at least one of sodium borohydrate, alane or ammonia borane.

11. The fuel cartridge of claim 9, further comprising at least one bulkhead (65) separating fuel compartments.

12. The fuel cartridge of claim 9, wherein the fuel compartments are thermally insulated from each other.

13. The fuel cartridge of claim 9, wherein the fuel compartments are polygonal.

14. The fuel cartridge of claim 9, wherein the switching mechanism is one of a magnetic read switch, percussion switch, over voltage, thermal lag, heater bank, altered resistive, reflective impedance, microprocessors, and thermal activate switch.

15. The fuel cartridge of claim 1 wherein the switching is one of a magnetic read switch, percussion switch, over voltage, thermal lag, heater bank, altered resistive, reflective impedance, microprocessors, and thermal activate switch.

* * * * *